(12) United States Patent
Manolakos et al.

(10) Patent No.: US 11,153,061 B2
(45) Date of Patent: Oct. 19, 2021

(54) SCHEMES FOR RECOVERY OF EMBB'S RS PUNCTURING FROM DYNAMIC MULTIPLEXING OF URLLC/EMBB

(71) Applicant: QUALCOMM Incorporated, San Diego, CA (US)

(72) Inventors: Alexandros Manolakos, San Diego, CA (US); Chong Li, Weehawken, NJ (US); Jing Jiang, San Diego, CA (US); Yu Zhang, Beijing (CN); Joseph Binamira Soriaga, San Diego, CA (US); Wanshi Chen, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 76 days.

(21) Appl. No.: 16/488,150

(22) PCT Filed: Mar. 29, 2018

(86) PCT No.: PCT/CN2018/081055
§ 371 (c)(1),
(2) Date: Aug. 22, 2019

(87) PCT Pub. No.: WO2018/177363
PCT Pub. Date: Oct. 4, 2018

(65) Prior Publication Data
US 2020/0007302 A1    Jan. 2, 2020

(30) Foreign Application Priority Data
Apr. 1, 2017   (WO) ................ PCT/CN2017/079384

(51) Int. Cl.
*H04L 5/02*   (2006.01)
*H04L 5/00*   (2006.01)

(52) U.S. Cl.
CPC ............ *H04L 5/023* (2013.01); *H04L 5/0005* (2013.01); *H04L 5/0042* (2013.01);
(Continued)

(58) Field of Classification Search
CPC ... H04L 5/0005; H04L 5/0042; H04L 5/0044; H04L 5/0048; H04L 5/0094; H04L 5/023;
(Continued)

(56) References Cited

U.S. PATENT DOCUMENTS

| 2014/0161066 | A1 | 6/2014 | Chmiel et al. | |
| 2018/0278454 | A1* | 9/2018 | Islam | .................... H04L 5/0073 |
| 2020/0052864 | A1* | 2/2020 | Hosseinian | ............. H04L 25/02 |

FOREIGN PATENT DOCUMENTS

| CN | 101931957 A | 12/2010 |
| CN | 102131225 A | 7/2011 |

(Continued)

OTHER PUBLICATIONS

International Search Report and Written Opinion—PCT/CN2017/079384—ISA/EPO—dated Jan. 5, 2018.
(Continued)

*Primary Examiner* — Thomas R Cairns
(74) *Attorney, Agent, or Firm* — Arent Fox, LLP

(57) ABSTRACT

Various aspects are described for schemes that address the potential puncturing of important reference signals (RSs) for enhanced mobile broadband (eMBB) applications, such as demodulation reference signal (DMRS), channel state information reference signal (CSIRS), tracking reference signal, and general reference signal. The schemes can be used for recovery of eMBB's RS puncturing from dynamic multiplexing of ultra-reliable-low-latency communications (URLLC) and eMBB. The schemes include a block-based scheme and an over-provisioning scheme. The schemes modify an existing RS pattern before puncturing occurs in
(Continued)

response to a presence of the URLLC traffic. In addition, there can be an option not to use (e.g., disable) time-domain orthogonal cover code (TD-OCC) for the RSs.

26 Claims, 16 Drawing Sheets

(52) U.S. Cl.
CPC .......... *H04L 5/0044* (2013.01); *H04L 5/0048* (2013.01); *H04L 5/0094* (2013.01)

(58) Field of Classification Search
CPC ....... H04L 5/0007–0012; H04L 5/0046; H04L 5/005–0051; H04L 5/026; H04L 25/0226; H04L 27/2613; H04L 27/26132–26316; H04J 13/00; H04J 13/0055
See application file for complete search history.

(56) References Cited

FOREIGN PATENT DOCUMENTS

| | | |
|---|---|---|
| CN | 105979597 A | 9/2016 |
| CN | 106231614 A | 12/2016 |
| EP | 3603259 A1 | 2/2020 |

OTHER PUBLICATIONS

International Search Report and Written Opinion—PCT/CN2018/081055—ISA/EPO—dated Jun. 21, 2018.
LG Electronics: "Discussion on Multiplexing of eMBB and URLLC", R1-1700512, 3GPP TSG RAN WG1 NR Ad-hoc Meeting, Jan. 20, 2017, 10 pages.
NTT DOCOMO Inc: "On Dynamic Multiplexing of eMBB and URLLC for Downlink", R1-1702817, 3rd Generation Partnership Project (3GPP), Mobile Competence Centre, 650, Route Des Lucioles, F-06921 Sophia-Antipolis, vol. RAN WG1, No. Athens. Greece; Feb. 13, 2017-Feb. 17, 2017, Feb. 12, 2017, XP051209962, Retrieved from the Internet: URL:http://www.3gpp.org/ftp/Meetings_3GPP_SYNC/RAN1/Docs/ [retrieved on Feb. 12, 2017], 4 pages.
Samsung: "DMRS Collision Avoidance for Multiplexing of eMBB and URLLC", 3GPP TSG RAN WG1 NR Meeting #88bis, 3GPP Draft; R1-1705408, 3rd Generation Partnership Project (3GPP), Mobile Compe Ience Centre; 650, Route Des Lucioles; F-06921 Sophia-Antipolis Cedex; France vol. RAN WG1, No. Spokane, USA; 20170403-20170407, Mar. 25, 2017 (Mar. 25, 2017), pp. 1-3, XP051251914, Retrieved from the Internet: URL: http://www.3gpp.org/ftp/tsg_ran/WG1_RL1/TSGR1_88b/Docs/, [retrieved Mar. 25, 2017].
Supplementary European Search Report—EP18774598—Search Authority—The Hague—dated Dec. 9, 2020.

* cited by examiner

SCHEMES FOR RECOVERY OF EMBB'S RS PUNCTURING FROM DYNAMIC MULTIPLEXING OF URLLC/EMBB

CROSS-REFERENCE TO RELATED APPLICATION

This application is a 35 U.S.C. § 371 National Phase Application of PCT Application No. PCT/CN2018/081055 entitled "SCHEMES FOR RECOVERY OF eMBB's RS PUNCTURING FROM DYNAMIC MULTIPLEXING OF URLLC/Embb" filed Mar. 29, 2018, which claims the benefit of PCT Application No. PCT/CN2017/079384 entitled "SCHEMES FOR RECOVERY OF eMBB's RS PUNCTURING FROM DYNAMIC MULTIPLEXING OF URLLC/Embb" filed Apr. 1, 2017, the disclosure of which is incorporated in its entirety herein by reference.

BACKGROUND

Aspects of the present disclosure relate generally to wireless communication networks, and more particularly, to various schemes for recovery of reference signals (RSs) from dynamic multiplexing of ultra-reliable-low-latency communications (URLLC) and enhanced mobile broadband (eMBB).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; URLLC with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current downlink dynamic multiplexing of URLLC/eMBB may not provide a desired level of reference signal (RS) recovery for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects are described for schemes that address the potential puncturing of important reference signals (RSs) for eMBB applications, such as demodulation reference signal (DMRS), channel state information reference signal (CSIRS), and tracking reference signal. The schemes can be used for recovery of eMBB's RS puncturing from dynamic multiplexing of URLLC and eMBB. The schemes may modify an existing RS pattern before puncturing occurs to reduce or minimize the effects of puncturing on the RS symbols within the eMBB traffic. For example, the schemes may modify the existing RS pattern configured for the eMBB traffic before puncturing occurs in response to a presence of the URLLC traffic. The schemes include a block-based scheme and an over-provisioning scheme. In addition, there can be an option not to use (e.g., disable) time-domain orthogonal cover code (TD-OCC) for the RSs.

In an aspect, the present disclosure provides a method for wireless communications including identifying, at a base station, at least one scheme supported by the base station for handling puncturing of RS symbols in eMBB traffic by URLLC traffic, wherein each of the at least one scheme modifies an existing RS pattern configured for the eMBB traffic before puncturing occurs in response to a presence of the URLLC traffic, and performing, at the base station, the at least one scheme in connection with downlink transmissions.

In another aspect, the present disclosure provides a method for wireless communications including receiving, at a user equipment (UE), an indication of at least one scheme for handling puncturing of RS symbols in eMBB traffic by URLLC traffic, wherein each of the at least one scheme modifies an existing RS pattern configured for the eMBB traffic before puncturing occurs in response to a presence of the URLLC traffic, at the UE, the at least one scheme in connection with downlink transmissions.

In another aspect, the present disclosure provides an apparatus for wireless communications. The apparatus may include a memory having stored instructions and a processor in communication with the memory. The processor may be configured to execute the instructions to identify, at a base station, at least one scheme supported by the base station for handling puncturing of RS symbols in eMBB traffic by URLLC traffic, wherein each of the at least one scheme modifies an existing RS pattern configured for the eMBB traffic before puncturing occurs in response to a presence of the URLLC traffic. The processor may be configured to execute the instructions to perform, at the base station, the at least one scheme in connection with downlink transmissions.

In another aspect, the present disclosure provides an apparatus for wireless communications. The apparatus may include a memory having stored instructions and a processor in communication with the memory. The processor may be configured to execute the instructions to receive at a UE, an indication of at least one scheme for handling puncturing of RS symbols in eMBB traffic by URLCC traffic, wherein each of the at least one scheme modifies an existing RS pattern configured for the eMBB traffic before puncturing occurs in response to a presence of the URLLC traffic. The processor may be configured to execute the instructions to perform, at the UE, the at least one scheme in connection with downlink transmissions.

Moreover, the present disclosure also includes apparatus having means for executing the above-described methods, and computer-readable medium storing one or more codes executable by a processor to perform the above-described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
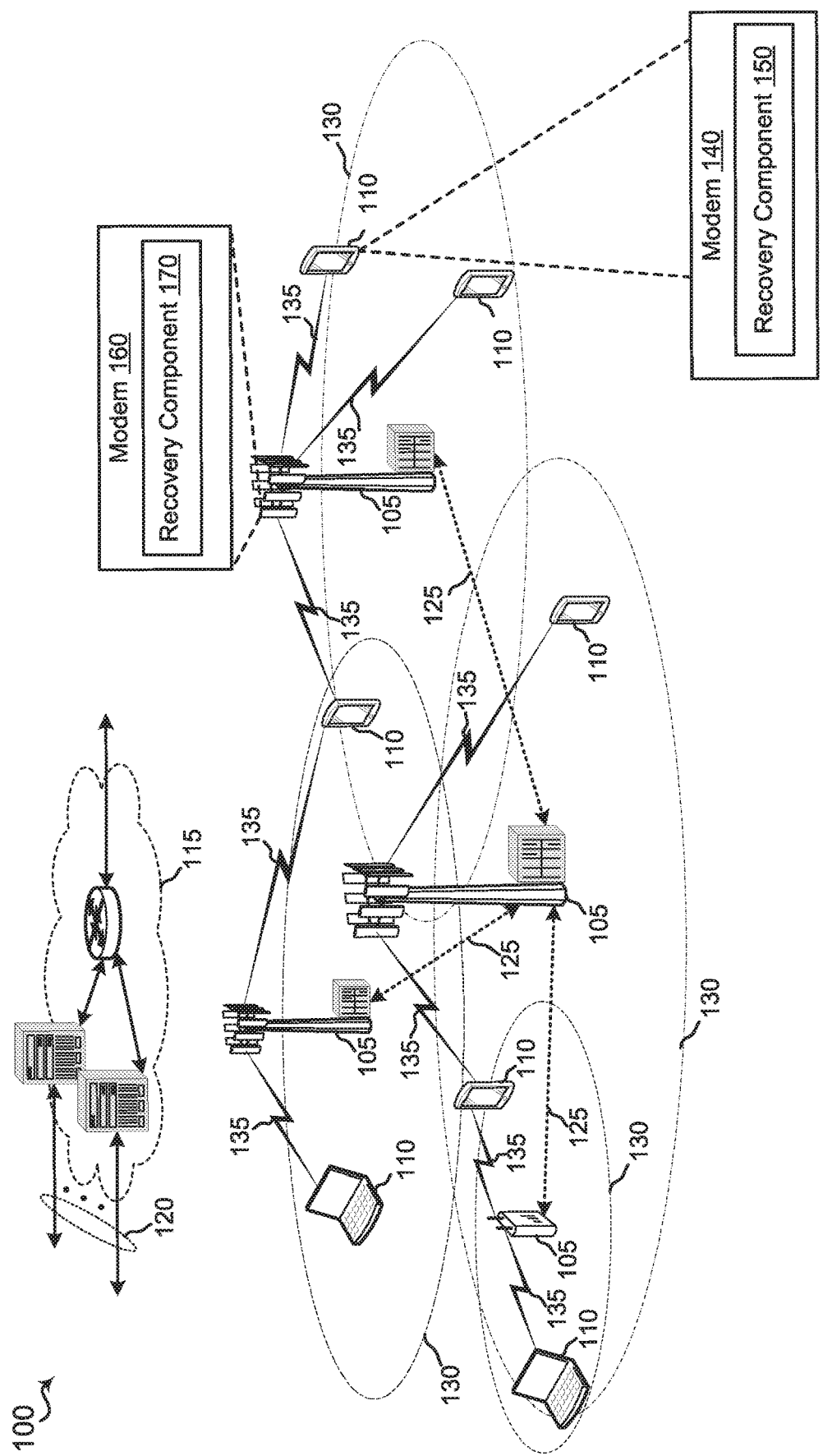
FIG. 1 is a schematic diagram of a wireless communication network including at least one user equipment (UE) and a base station configured according to this disclosure to handle recovery of eMBB's RS puncturing from dynamic multiplexing of URLLC and eMBB.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to various schemes for recovery of RS from dynamic multiplexing of ultra-reliable-low-latency communications (URLLC) and enhanced mobile broadband (eMBB). Various aspects are described for schemes that address the potential puncturing of important RSs for eMBB applications, such as demodulation reference signal (DMRS), channel state information reference signal (CSIRS), and tracking reference signal (CSIRS for tracking). The schemes can be used for recovery of eMBB's RS puncturing from dynamic multiplexing of URLLC and eMBB. The schemes can include one or more of an indication-based dynamic RS pattern scheme, a block-based scheme, or an over-provisioning scheme. In addition, there can be an option not to use (e.g., disable) time-domain orthogonal cover code (TD-OCC) for the RSs.

Additional features of the present aspects are described in more detail below with respect to FIGS. 1-15.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a recovery component 150 that handles various aspects of processing potential puncturing of important reference signals (RSs) for eMBB applications for situations in which there is dynamic multiplexing of URLLC/eMBB communications in downlink transmissions, including receiving and processing indications associated with a scheme used to address the potential RS puncturing. Further, wireless communication network 100 includes at least one base station 105 with a modem 160 having a recovery component 170 that handles various aspects of processing potential puncturing of important reference signals (RSs) for eMBB applications for situations in which there is dynamic multiplexing of URLLC/eMBB communications in downlink transmissions, including generating and transmitting indications associated with a scheme used to address the potential RS puncturing.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Additional aspects are provided below regarding various schemes for recovering puncturing that may happen on any type of reference signal (RS) of eMBB, where the puncturing will happen from a URLLC transmission.

Figure 2:
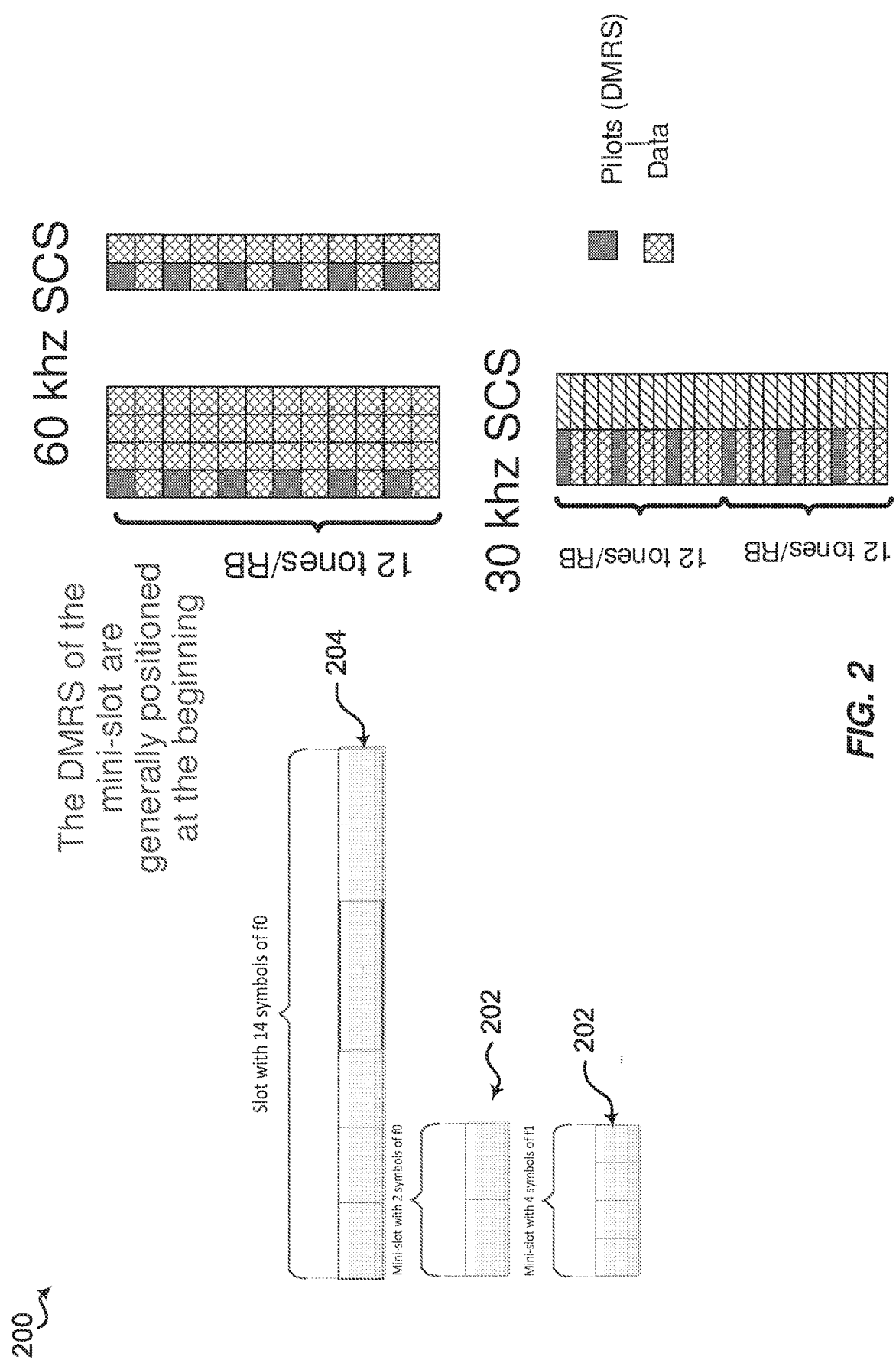
FIG. 2 is a schematic diagram of a slot or mini-slot and different subcarrier spacing (SCS)

Referring to FIG. 2, a diagram 200 is shown that illustrates examples of a mini-slot 202, which can be the smallest scheduling unit for NR. Mini-slots are a methodology used to schedule low latency users (e.g., URLLC users) because they may only need a small amount of data and they may need it fast. The mini-slot 202 could have control at the beginning, and/or at the end, or no control at all. The mini-slot 202 could have a duration as small as 1 symbol (e.g., 1 OFDM symbol). The mini-slot can potentially have a pilot in the first symbol, and data in the remaining symbols. The mini-slot 202 can have a subcarrier spacing (SCS) or numerology different than the regular eMBB slot. For example, as illustrated in FIG. 2, an eMBB slot 204 can have an SCS of f0, which may be, for example, 30 kHz. The eMBB slot 204 can have 14 OFDM symbols. As illustrated, the mini-slot 202 may have a length of 2 eMBB OFDM symbols. The mini-slot 202 may have an SCS of either 60 kHz (2 symbols) or 30 kHz (4 symbols). The DMRS of the mini-slot may be generally positioned at the beginning. In addition, because scalable numerology is supported in 5G, a change in symbol duration can occur with a change in SCS.

Figure 3:
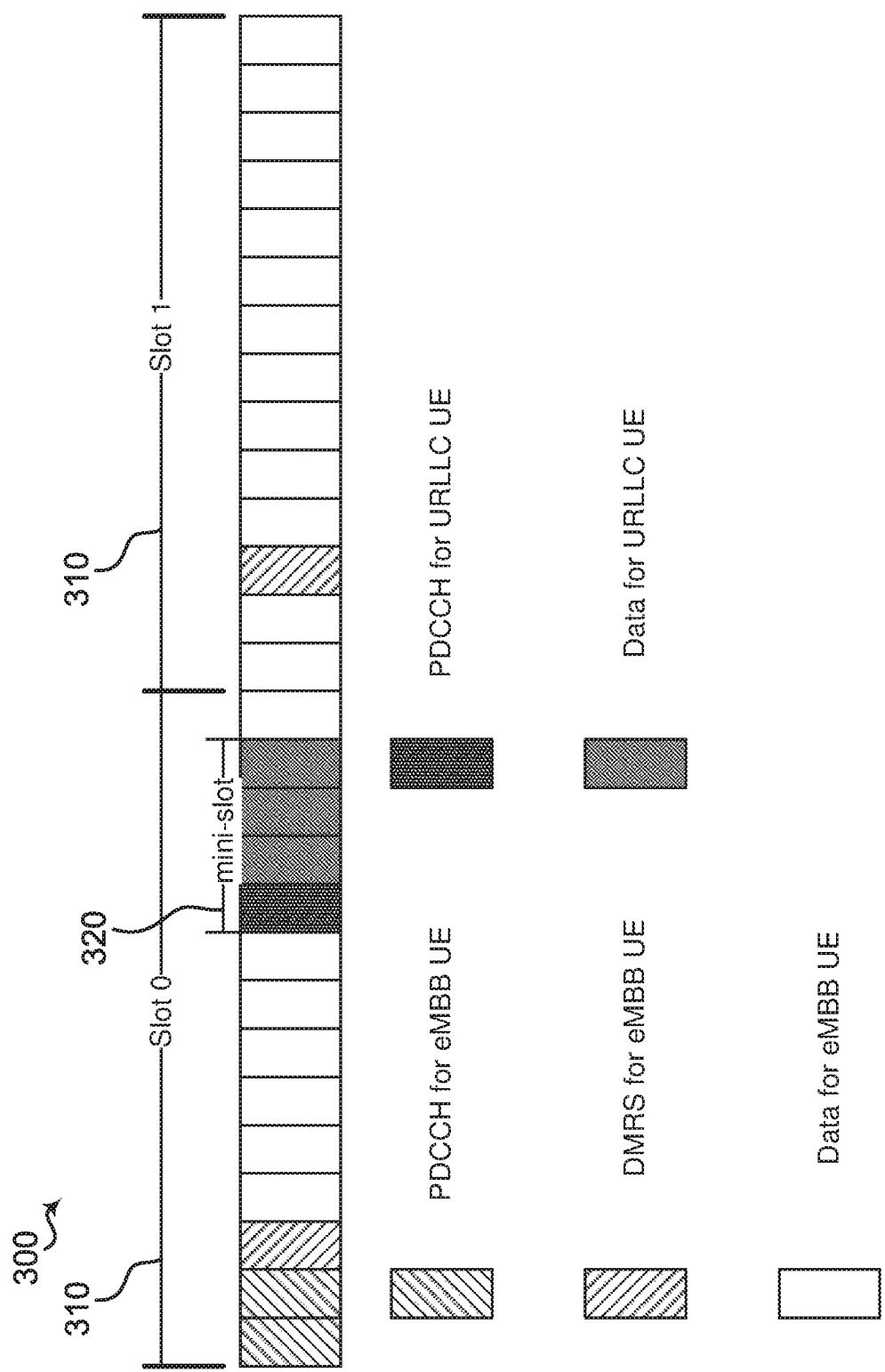
FIG. 3 is a schematic diagram of a mini-slot and URLLC.

Referring to FIG. 3, a diagram 300 is shown in connection with the efficient support of URLLC and eMBB services on shared resources. Dynamic resource sharing is one very important design issue for NR. One way to support URLLC is to enable dynamic multiplexing with eMBB. The sporadic URLLC transmission bursts may preempt parts of the already scheduled eMBB transmissions to UEs. In the downlink (DL), this can be accomplished by using slots 310 for the eMBB transmissions and mini-slots 320 for URLLC transmissions. One example is illustrated in FIG. 3. In that example, there are 2 aggregated 14-symbol slots 310 with SCS=30 kHz that are used to carry the eMBB transmissions and one 4-symbol mini-slot 320 with the same SCS that is used for URLLC.

In FIG. 3, eMBB users may use SLOT 0 and SLOT 1 and the eNB may determine that there is data for a URLLC transmission in one slot 310 that cannot wait until a next opportunity (e.g., a next slot). Thus, the eNB schedules the mini-slot 320 for URLLC such that the URLLC user gets the data it needs fast, that is, the eNB gives priority to the URLLC user even though the eMBB user was already scheduled to use those resources. The eMBB user takes a hit in performance as a result. Therefore, in an aspect, an indication to the eMBB user that the preemption/dynamic multiplexing/puncturing is taking place may allow the eMBB user to recover from that issue. There may be different times at which such an indication can be provided to the eMBB user.

Figure 4:
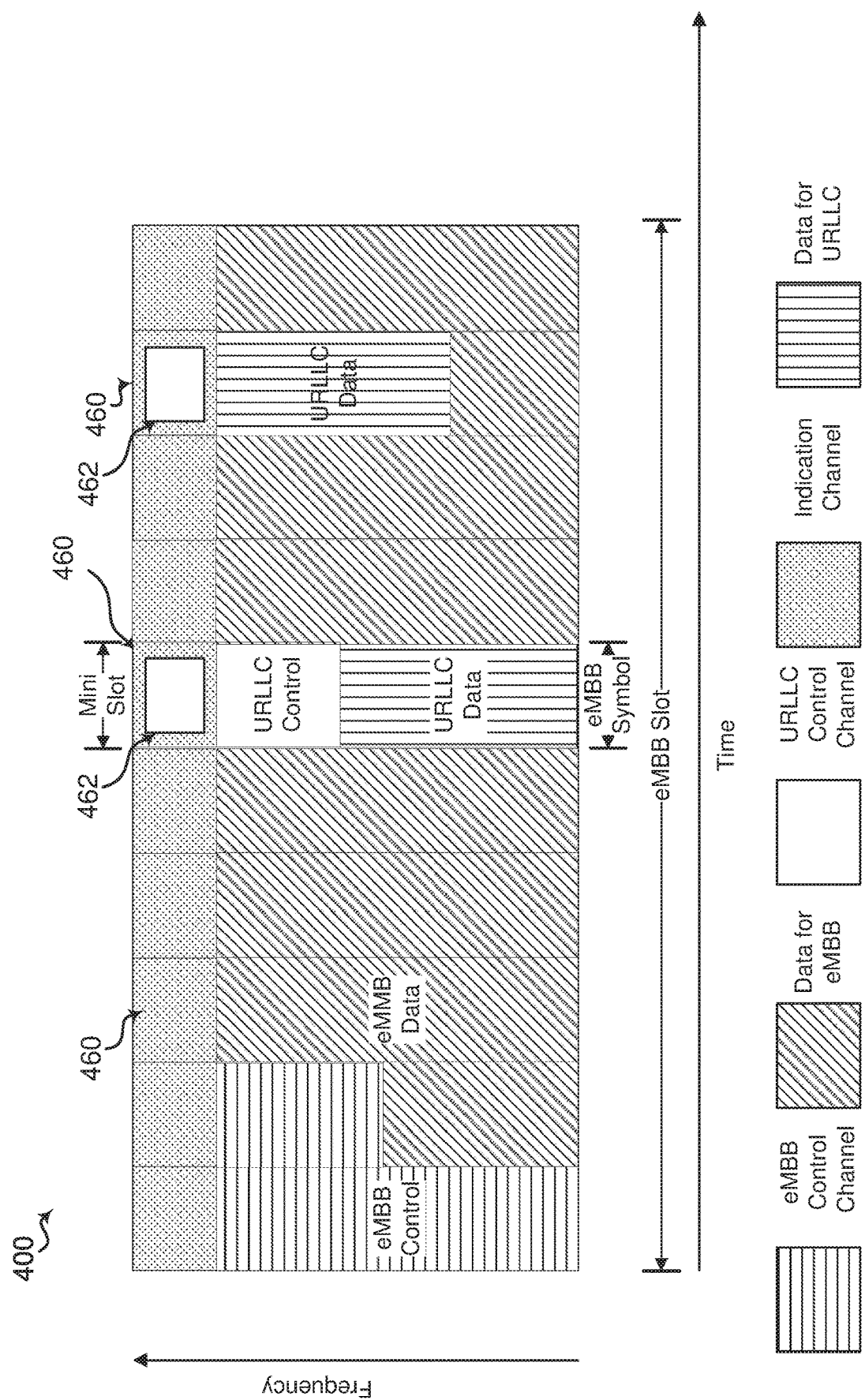
FIG. 4 is a schematic diagram of a current indication of URLLC/eMBB dynamic multiplexing.

Referring to FIG. 4, a diagram 400 is shown describing aspects in connection with DL URLLC/eMBB dynamic multiplexing and indication design. In FIG. 4, there is shown an indication-based multiplexing approach, which is beneficial for both URLLC and eMBB UEs at the cost of indicator overhead. The indication 462 shown is a current indication (current with respect to URLLC) that is transmitted on the indication channel 460 whenever puncturing by URLLC occurs. The indication channel 460 shown in FIG. 4 is frequency-division multiplexed (FDM) with the actual slot.

Figure 5A:
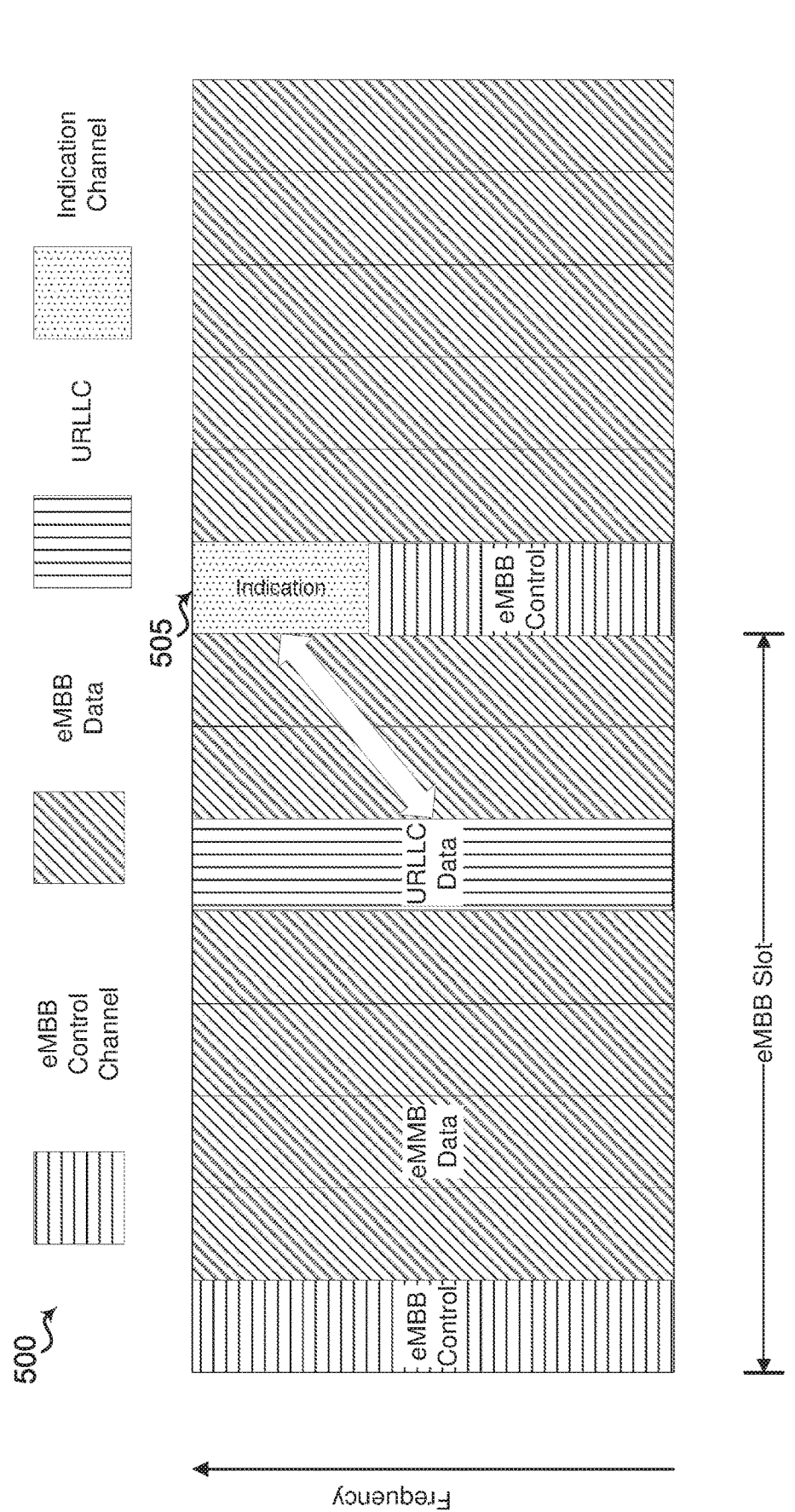
FIG. 5A is a schematic diagram of a post indication of URLLC/eMBB dynamic multiplexing.

Referring to FIG. 5A, a diagram 500 is shown describing aspects in connection with DL URLLC/eMBB dynamic multiplexing and indication design. Like FIG. 4, there is shown an indication-based multiplexing approach, which is beneficial for both URLLC and eMBB UEs at the cost of indicator overhead. The indication 505 shown is a post-indication for both URLLC and the eMBB. For example, the indication 505 may be transmitted in an eMBB slot subsequent to an eMBB slot in which the puncturing occurs.

Figure 5B:
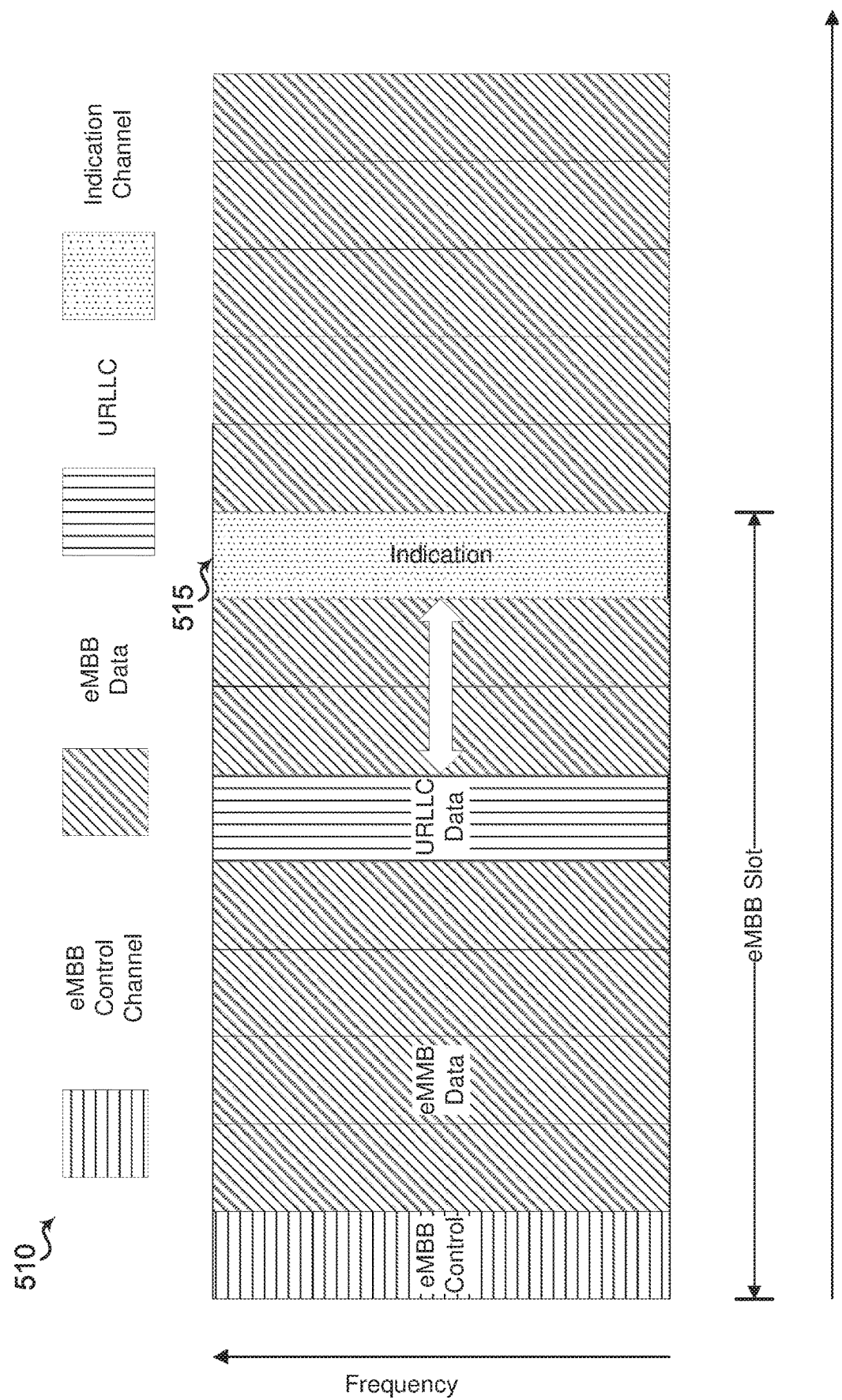
FIG. 5B is a schematic diagram of another post indication of URLLC/eMBB dynamic multiplexing.

Referring to FIG. 5B, a diagram 510 is shown describing aspects in connection with DL URLLC/eMBB dynamic multiplexing and indication design. Like FIGS. 4 and 5B, there is shown an indication-based multiplexing approach, which is beneficial for both URLLC and eMBB UEs at the cost of indicator overhead. The indication 515 shown is a post-indication for the URLLC and current with respect to the eMBB. That is, the indication 515 may be transmitted within the eMBB slot that is punctured.

Figure 6:
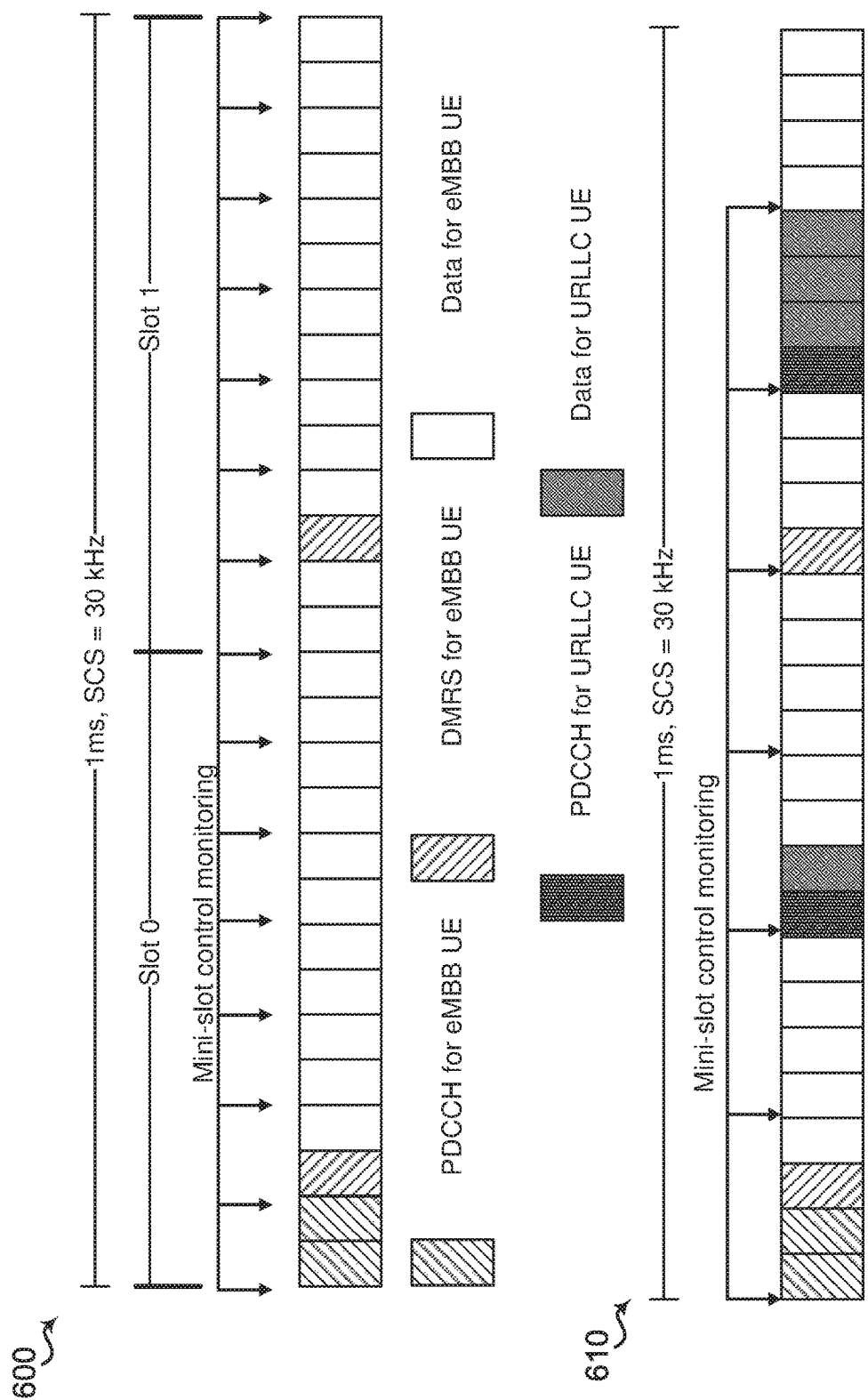
FIG. 6 is a schematic diagram of URLLC puncturing of eMBB's RSs.

One of the issues with the puncturing or preemption described above is that the puncturing may occur when reference signals (RSs) are scheduled to be transmitted for the eMBB user. Referring to FIG. 6, diagrams 600 and 610 are shown to describe URLLC puncturing of eMBB RSs. In these diagrams, URLLC transmission on the DL may puncture the RS of the eMBB UE. The RSs can be one or more of DMRS, CSIRS, tracking RS (CSI RS for tracking), or general RS. The tracking RS may be used for Doppler estimation and/or delay spread estimation. As shown in diagram 600, a mini-slot control monitoring is done at several locations in the eMBB slots to see if an URLLC user is asking for the channel and therefore these locations will be associated with the use of a mini-slot for the URLLC user.

Some mini-slots may puncture data and not RSs. However, there could be the case that a mini-slot punctures RS symbols. If, for example, a DMRS is lost due to puncturing, channel estimation for the entire slot would be inaccurate and demodulation would result in the wrong data. Similarly, puncturing CSIRS symbols could result in bad or inaccurate CSI, and puncturing tracking RS symbols could result in incorrect delay spread, or Doppler spread calculations. The eMBB performance can be recovered by using any one of the solutions/schemes described below. These solutions/schemes can be used for any of the RSs described above.

Figure 7:
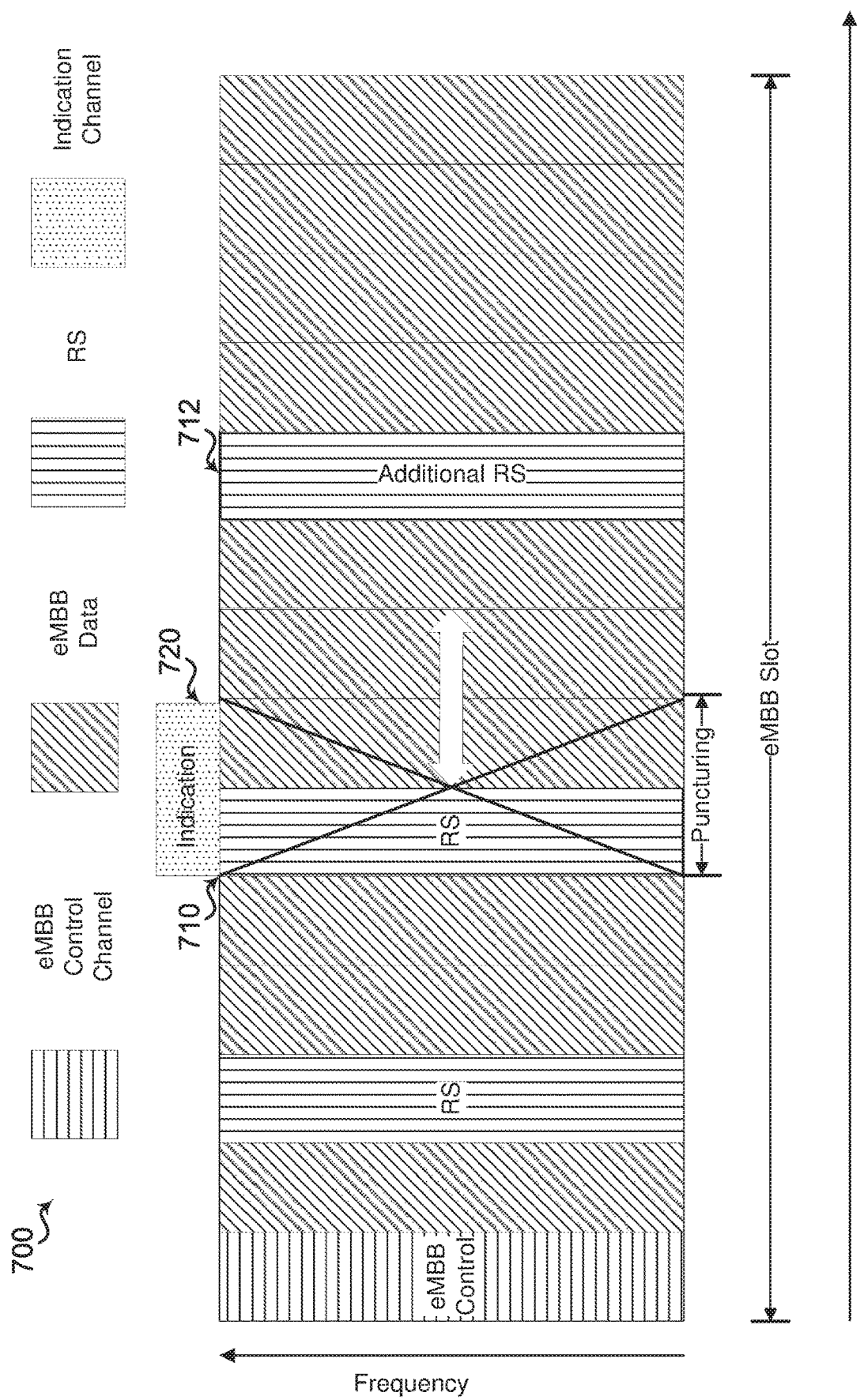
FIG. 7 is a schematic diagram of an indication-based dynamic RS pattern scheme for recovery of eMBB's RSs.

Referring to FIG. 7, a diagram 700 is shown in connection with an indication-based dynamic RS pattern scheme or solution that can be applied to address potential RS puncturing by URLLC/eMBB dynamic multiplexing. If RS has to be punctured, eNB (e.g., base station or gNB) can re-schedule the RS, even in the same slot. For example, the RS 710 can be moved to the next symbol or to a few symbols later in the slot, and the eNB can notify the eMBB UEs via current indication 720 or a post-indication as described above. In the scenario of a current indication 720, the RS puncturing notification can be embedded inside the current indication.

In the example shown in diagram 700, two symbols are punctured by URLLC. An additional RS 712 is sent (e.g., at symbol 9) because URLLC punctured the previous RS 710 (e.g., at symbol 5). This additional RS 712 is not scheduled if URLLC puncturing has not occurred. Moreover, the base station or gNB can embed inside the indication 720 that the UE is to expect a new RS. The location of the new RS in case of such notification can be pre-configured semi-statically, (with L2 (MAC CE) or L3 (RRC) signaling), or it can even be embedded inside the indication 720.

When a current indication is used, the indication 720 provides information as to where the puncturing occurs, but there also needs to be some form of knowing where the additional RS 712 that is going to be sent will be in the slot. That information may have been configured already in a semi-static manner. For example, going back to the example in FIG. 7, once the RS 710 in symbol 5 was punctured, the location for the additional RS 712 was configured to be symbol 9. To take the example further, if the additional RS 712 in symbol 9 were also to be punctured, there may be a configured subsequent symbol (e.g., symbol 10, 11, or 12) where an additional RS would be scheduled. This changing of the RS positions may be referred to a dynamic RS pattern given that the locations of the RS symbols may change dynamically based on where the URLLC transmission takes place within a slot.

Figure 8:
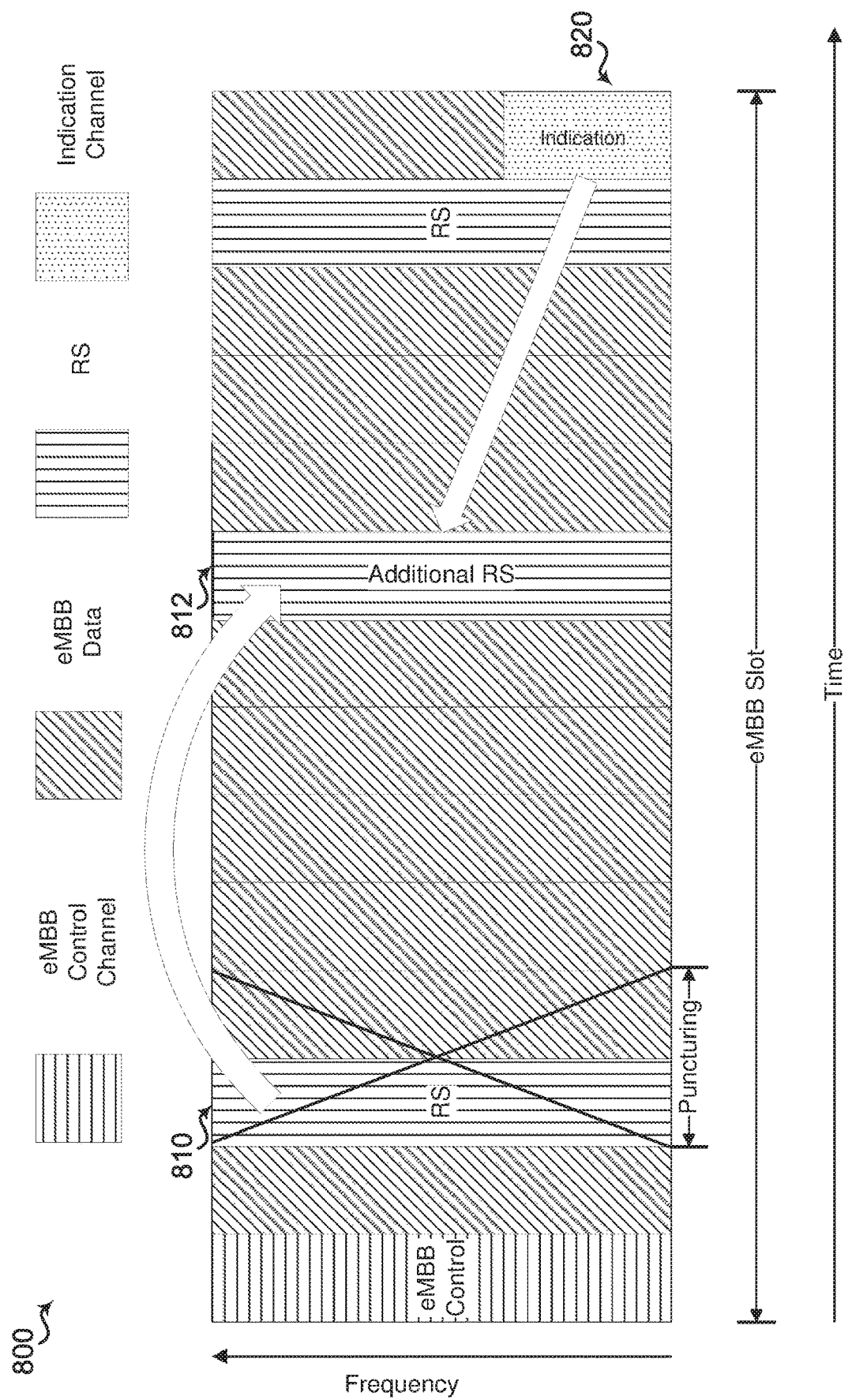
FIG. 8 is a schematic diagram of another indication-based dynamic RS pattern scheme for recovery of eMBB's RSs.

Referring to FIG. 8, a diagram 800 is shown in connection with an indication-based dynamic RS pattern scheme or solution that can be applied to address potential RS puncturing by URLLC/eMBB dynamic multiplexing. In this example, the indication channel 820 is at the end of the slot and, consequently, a post-indication approach is being used. If RS 810 has to be punctured, NB (e.g., base station or gNB) can re-schedule the RS 810. For example, the RS 810 can be moved to the next symbol or to a few symbols later in the slot as an additional RS 812, and the eNB can notify the eMBB UEs via post indication.

In the example shown in diagram 800, the additional RS 812 is sent because URLLC punctured the previous RS 810. This additional RS 812 is not scheduled if RS puncturing due to the URCCL transmission has not occurred. Since the UE is expecting the indication in the end of the slot, it is likely that the UE has not yet started the demodulation/decoding of data. When the UE receives the indication channel 820, the UE sees that actually the first RS 810 has been corrupted and there is a new additional RS 812 scheduled. The UE has buffered the symbols, and can throw away the bad measurement(s) and repeat the channel estimation and data demodulation and decoding procedures with the uncorrupted additional RS 812. Moreover, the base station 105 or gNB can embed inside the indication channel 820 that the UE has received an additional RS 812 in a new location, and that the previous RS 810 is corrupted.

Figure 9:
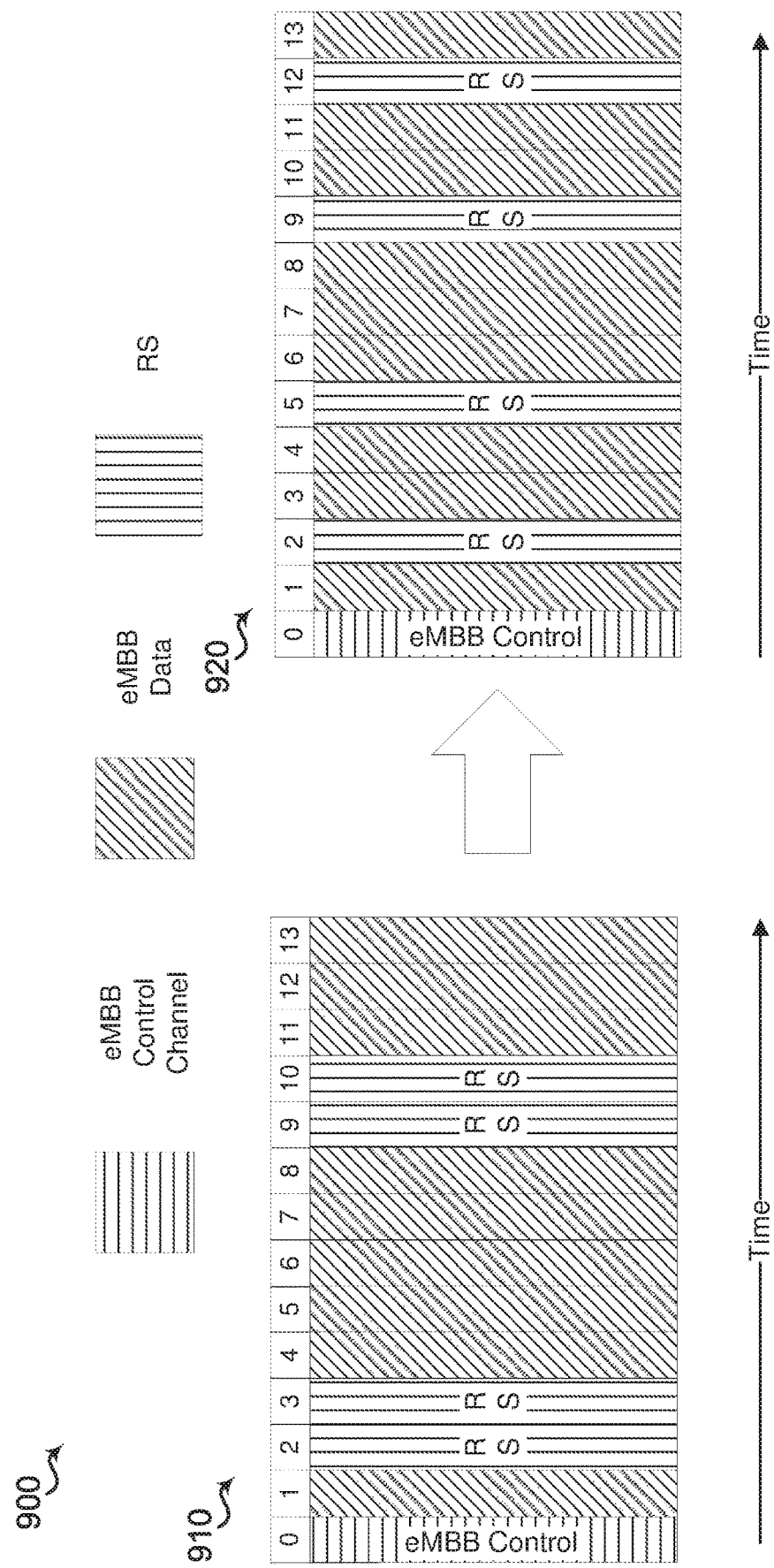
FIG. 9 is a schematic diagram of a block-based scheme for recovery of eMBB's RSs.

Referring to FIG. 9, a diagram 900 is shown in connection with a block-based scheme or solution that can be applied to address potential RS puncturing by URLLC/eMBB dynamic multiplexing. This scheme, as well as the scheme described below with respect to FIG. 10, modify or change an existing RS pattern 910 to avoid, reduce, or minimize the effects of puncturing on RSs in the eMBB slot. For example, the block-based scheme may modify an existing RS pattern configured for the eMBB traffic before puncturing occurs in response to a presence of the URLLC traffic In this scheme, the gNB can spread the fixed RS symbols within a slot, then URLLC puncturing may only occur in gaps between RSs (e.g., in data symbols). It is very likely that one symbol delayed puncturing (RS symbol blocking) may not have much of an effect on URLLC performance, so a delay of one symbol for URLLC to avoid puncturing eMBB RS symbols can be tolerated. In this scheme, it is important to ensure that there are no time-domain consecutive RS symbols, to minimize the probability of long delay of URLLC.

The example modified RS pattern 920 shown in diagram 900 of FIG. 9 illustrates the different arrangement of RSs to allow for multiple symbols between RSs that can be used for URLLC transmissions. In this example modified RS pattern 920, there can be mini-slots of two symbols (e.g., symbols 3 and 4) and mini-slots of 3 symbols (e.g., symbols 6, 7, 8) used without puncturing any of the RS symbols present. Further, since each of the RS is only one symbol long, the maximum delay in scheduling the URLLC transmission is one symbol.

The scheme described in connection with FIG. 9 can be assumed as the default scheme (in those instances when multiple schemes may be supported). The UE can safely use the RSs without worrying that any RS was punctured. No need of blindly figuring out whether an RS was punctured.

There may be some notification or pre-configuration indicating how the RS pattern is to change in the block-based scheme. For example, the base station 105 may transmit a notification to eMBB UEs when there is a lot of sporadic URLLC traffic. That is, when a number or frequency of URLLC traffic satisfies a threshold, the base station 105 may transmit a notification indicating that the existing RS pattern 910 is to be changed to the modified RS pattern 920. This notification or pre-configuration can be made in a semi-static manner.

Figure 10:
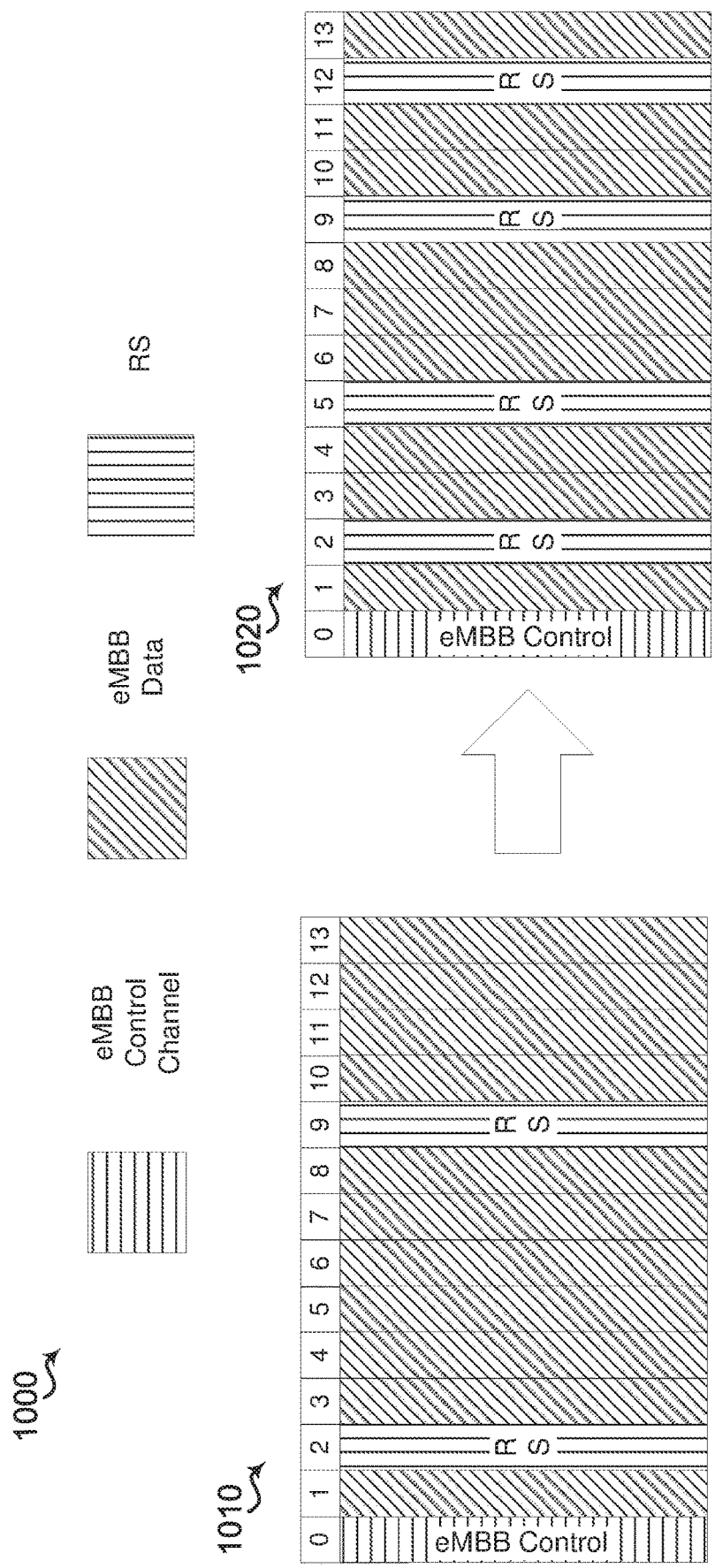
FIG. 10 is a schematic diagram of an over-provisioning scheme for recovery of eMBB's RSs.

Referring to FIG. 10, a diagram 1000 is shown in connection with an over-provisioning scheme or solution that can be applied to address potential RS puncturing by URLLC/eMBB dynamic multiplexing. The over-provisioning scheme may modify an existing RS pattern configured for the eMBB traffic before puncturing occurs in response to a presence of the URLLC traffic In this scheme, the gNB can schedule more RS symbols than what is needed, assuming some probability of URLLC traffic needed to be transmitted and some probability of that URLLC traffic indeed puncturing at least one of the RS symbols. In this case, the gNB does not schedule more RSs depending on actual RS puncturing by the already transmitted URLLC traffic, but the gNB preemptively schedules the additional RSs. For example, the existing RS pattern 1010 may include RS in two symbols (e.g., 2 and 9). Based on a URLLC traffic pattern, the gNB may determine to change the RS pattern to the modified RS pattern 1020, which includes RS in four symbols (e.g., 2, 5, 9, and 12). The gNB can notify the UE that this scheme is chosen. For example, the base station 105 may transmit a notification to eMBB UEs when there is a lot of sporadic URLLC traffic. That is, when a number or frequency of URLLC traffic satisfies a threshold, the base station 105 may transmit a notification indicating that the existing RS pattern 1010 is to be changed to the modified RS pattern 1020. The eMBB UEs might need to do some blind estimations to determine whether some of the RSs were corrupted.

Figure 11:
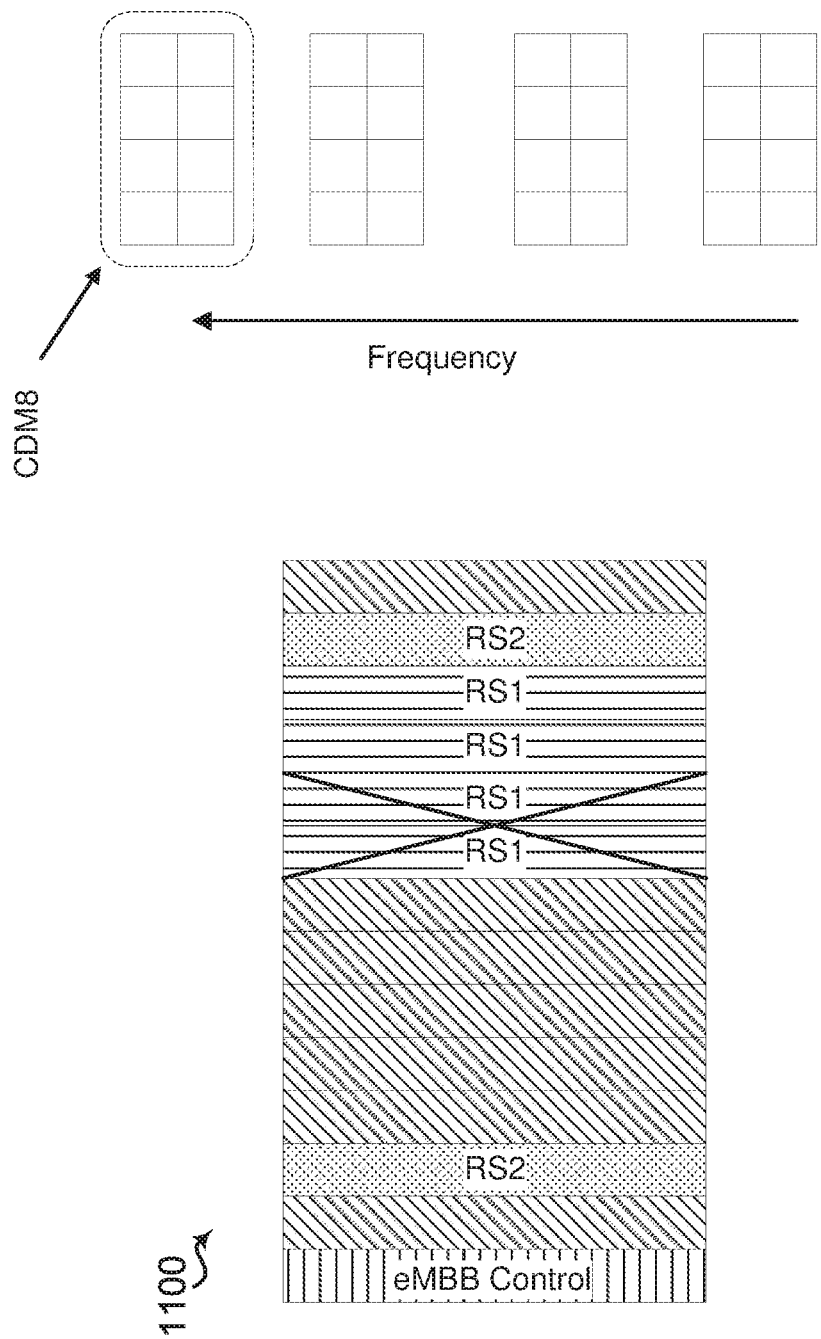
FIG. 11 is a schematic diagram of removal of TD-OCC in connection with recovery of eMBB's RSs.

Referring to FIG. 11, a diagram 1100 is shown in connection with the removal or disabling of time-domain orthogonal cover code (TD-OCC) for the RSs. There is an option to not use TD-OCC for RSs (even if they are consecutive). For CSIRS for example, a 4-symbol CSIRS may be transmitted. In a first option, the 4 symbols may be spread apart, similar to the block-based scheme discussed with respect to FIG. 9. In another option, the 4 symbols may remain consecutive but without TD-OCC. The TD-OCC may be removed because if TD-OCC is applied and one symbol is punctured, all four symbols may be punctured. The disabling of TD-OCC can be enabled when there is significant URLLC traffic (e.g., an amount or rate of URLLC traffic satisfies a threshold).

In other aspects, when dealing with DMRS, and the rank of the transmission is large, then the block-based scheme may be preferred. No DMRS should be punctured even if there is retransmission (reTx)) because the DMRS are placed in an "optimal" arrangement in the slot. That is, a large or high rank transmission (e.g., high spectral efficiency slots) needs good channel quality and good channel estimation. Even if there is a DMRS reTx, the location of the retransmission might not be the best. For example, the original location of DMRS in the slot may have been selected to allow the UE to perform interpolation in order to obtain a good channel estimation.

Similarly, if a UE moves at a very high speed where the channel decorrelates very fast, the selected scheme may depend on the Doppler/mobility of the eMBB user (in which case already there is a need for many DMRS) and the over-provisioning scheme may not be applicable. In this case, the block-based scheme may again be preferred.

When multiple schemes are supported, it may be possible to switch between the schemes that are supported. For example, the gNB schedules an RS resource, and then, through L1 or L2 or L3 signaling, the gNB notifies the UE which scheme may be implemented as a scheme for recovery if puncturing of that specific RS resource is expected. For the same UE, for different RS resources, different schemes could be applied. For example, the DMRS resource may be dynamically re-scheduled based on an indication based dynamic RS pattern scheme, but the CSIRS resource can use the over-provisioning scheme.

The chosen scheme can be cell-specific/UE-specific/RS-resource-specific. For example, the scheme that is chosen can be the same for all the UEs in a cell, can be selected specifically for a UE based on certain conditions or criteria, or can be selected specifically for a type of RS resource.

Figure 12:
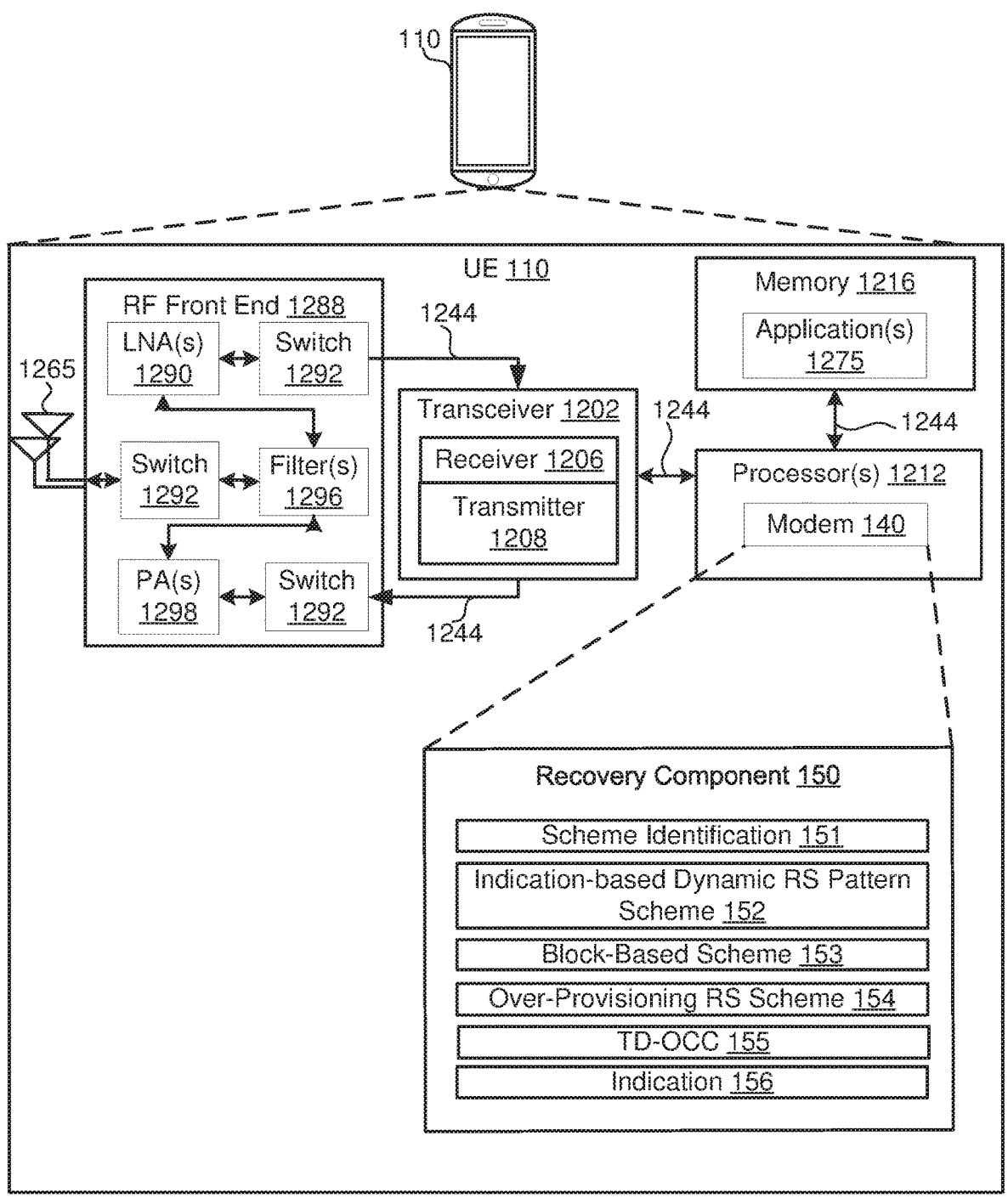
FIG. 12 is a schematic diagram of example components of the UE of FIG. 1.

Referring to FIG. 12, one example of an implementation of UE 110 may include a variety of components, some of which have already been described above, but including components such as one or more processors 1212 and memory 1216 and transceiver 1202 in communication via one or more buses 1244, which may operate in conjunction with modem 140 and recovery component 150 to enable one or more of the functions described herein related to schemes for recovery of RS from dynamic multiplexing of URLLC and eMBB. Further, the one or more processors 1212, modem 1214, memory 1216, transceiver 1202, RF front end 1288 and one or more antennas 1286, may be configured to support voice and/or data calls (simultaneously or non-simultaneously) in one or more radio access technologies.

In an aspect, the one or more processors 1212 can include a modem 140 that uses one or more modem processors. The various functions related to recovery component 150 may be included in modem 140 and/or processors 1212 and, in an aspect, can be executed by a single processor, while in other aspects, different ones of the functions may be executed by a combination of two or more different processors. For example, in an aspect, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 and/or modem 140 associated with recovery component 150 may be performed by transceiver 1202.

Also, memory 1216 may be configured to store data used herein and/or local versions of applications 1275 or recovery component 150 and/or one or more of its subcomponents being executed by at least one processor 1212. Memory 1216 can include any type of computer-readable medium usable by a computer or at least one processor 1212, such as random access memory (RAM), read only memory (ROM), tapes, magnetic discs, optical discs, volatile memory, non-volatile memory, and any combination thereof. In an aspect, for example, memory 1216 may be a non-transitory computer-readable storage medium that stores one or more computer-executable codes defining recovery component 150 and/or one or more of its subcomponents, and/or data associated therewith, when UE 110 is operating at least one processor 1212 to execute recovery component 150 and/or one or more of its subcomponents.

Transceiver 1202 may include at least one receiver 1206 and at least one transmitter 1208. Receiver 1206 may include hardware, firmware, and/or software code executable by a processor for receiving data, the code comprising instructions and being stored in a memory (e.g., computer-readable medium). Receiver 1206 may be, for example, a radio frequency (RF) receiver. In an aspect, receiver 1206 may receive signals transmitted by at least one base station 105. Additionally, receiver 1206 may process such received signals, and also may obtain measurements of the signals, such as, but not limited to, Ec/Io, SNR, RSRP, RSSI, etc. Transmitter 1208 may include hardware, firmware, and/or software code executable by a processor for transmitting data, the code comprising instructions and being stored in a memory (e.g., computer-readable medium). A suitable example of transmitter 1208 may include, but is not limited to, an RF transmitter.

Moreover, in an aspect, UE 110 may include RF front end 1288, which may operate in communication with one or more antennas 1265 and transceiver 1202 for receiving and transmitting radio transmissions, for example, wireless communications transmitted by at least one base station 105 or wireless transmissions transmitted by UE 110. RF front end 1288 may be connected to one or more antennas 1265 and can include one or more low-noise amplifiers (LNAs) 1290, one or more switches 1292, one or more power amplifiers (PAs) 1298, and one or more filters 1296 for transmitting and receiving RF signals.

In an aspect, LNA 1290 can amplify a received signal at a desired output level. In an aspect, each LNA 1290 may have a specified minimum and maximum gain values. In an aspect, RF front end 1288 may use one or more switches 1292 to select a particular LNA 1290 and its specified gain value based on a desired Pain value for a particular application.

Further, for example, one or more PA(s) 1298 may be used by RF front end 1288 to amplify a signal for an RF output at a desired output power level. In an aspect, each PA 1298 may have specified minimum and maximum gain values. In an aspect, RF front end 1288 may use one or more switches 1292 to select a particular PA 1298 and its specified gain value based on a desired gain value for a particular application.

Also, for example, one or more filters 1296 can be used by RF front end 1288 to filter a received signal to obtain an input RF signal. Similarly, in an aspect, for example, a respective filter 1296 can be used to filter an output from a respective PA 1298 to produce an output signal for transmission. In an aspect, each filter 1296 can be connected to a specific LNA 1290 and/or PA 1298. In an aspect, RF front end 1288 can use one or more switches 1292 to select a transmit or receive path using a specified filter 1296, LNA 1290, and/or PA 1298, based on a configuration as specified by transceiver 1202 and/or processor 1212.

As such, transceiver 1202 may be configured to transmit and receive wireless signals through one or more antennas 1265 via RF front end 1288. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 1202 to operate at a specified frequency and power level based on the UE configuration of the UE 110 and the communication protocol used by modem 140.

In an aspect, modem 140 can be a multiband-multimode modem, which can process digital data and communicate with transceiver 1202 such that the digital data is sent and received using transceiver 1202. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 1288, transceiver 1202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Recovery component 150 can include one or more subcomponents to perform aspects of eMBB RS recovery from the perspective of a UE. For example, recovery component 150 can include a scheme identification 151 that can identify a supported scheme for handling recovery of eMBB's RS puncturing from dynamic multiplexing of URLLC and eMBB. The recovery component 150 can receive information or indications/notifications with information that can be used to identify or select a scheme. In this regard, the recovery component 150 can include an indication 156 that can receive, process, or otherwise handle different indications/notifications. For example, the indication 156 can process notifications used for semi-static pre-configuration, as well as current indications and post-indications as described above with respect to FIGS. 4, 5A, and 5B. Moreover, the indication 156 can process indications associated with the disabling or removal of TD-OCC. Scheme-related indications and TD-OCC-related indications can be provided separately or together.

The recovery component 150 can also include one or more subcomponents associated with different recovery schemes. For example, recovery component 150 can include an indication-based dynamic RS pattern scheme 152, a block-based scheme 153, and an over-provisioning RS scheme 154. In some implementations, a subset of these subcomponents can be used. The recovery component 150 can also include a TF-OCC 155 subcomponent to handle the removal of TD-OCC for some RSs.

Figure 13:
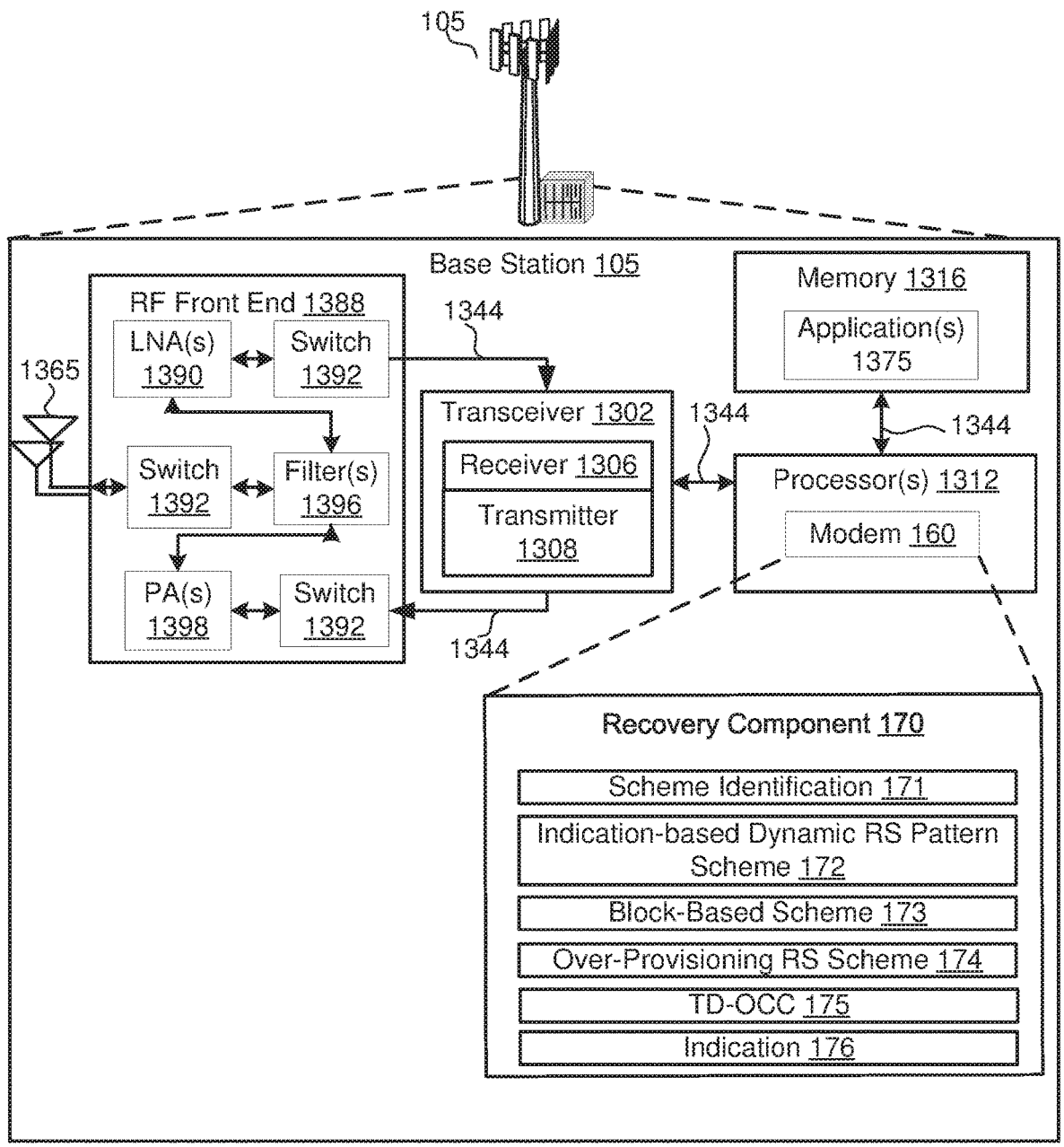
FIG. 13 is a schematic diagram of example components of the base station of FIG. 1.

Referring to FIG. 13, one example of an implementation of base station 105 may include a variety of components, some of which have already been described above, but including components such as one or more processors 1312 and memory 1316 and transceiver 1302 in communication via one or more buses 1344, which may operate in conjunction with modem 160 and recovery component 170 to enable one or more of the functions described herein related to schemes for recovery of RS from dynamic multiplexing of URLLC and eMBB.

The transceiver 1302, receiver 1306, transmitter 1308, one or more processors 1312, memory 1316, applications 1075, buses 1344, RF front end 1388, LNAs 1390, switches 1392, filters 1396, PAs 1398, and one or more antennas 1365 may be the same as or similar to the corresponding components of UE 110, as described above, but configured or otherwise programmed for base station operations as opposed to UE operations.

Recovery component 170 can include one or more sub-components to perform aspects of eMBB RS recovery from the perspective of a base station. For example, recovery component 170 can include a scheme identification 171 that can identify a supported scheme for handling recovery of eMBB's RS puncturing from dynamic multiplexing of URLLC and eMBB. The recovery component 170 can generate and transmit information or indications/notifications with information that can be used to identify or select a scheme. In this regard, the recovery component 170 can include an indication 176 that can generate, process, or otherwise handle different indications/notifications. For example, the indication 176 can provide notifications used for semi-static pre-configuration, as well as current indications and post-indications as described above with respect to FIGS. 4, 5A, and 5B. Moreover, the indication 176 can provide indications associated with the disabling or removal of TD-OCC. Scheme-related indications and TD-OCC-related indications can be provided separately or together.

The recovery component 170 can also include one or more subcomponents associated with different recovery schemes. For example, recovery component 170 can include an indication-based dynamic RS pattern scheme 172, a block-based scheme 173, and an over-provisioning RS scheme 174. In some implementations, a subset of these subcomponents can be used. The recovery component 170 can also include a TD-OCC 175 subcomponent to handle the removal of TD-OCC for some RSs.

Figure 14:
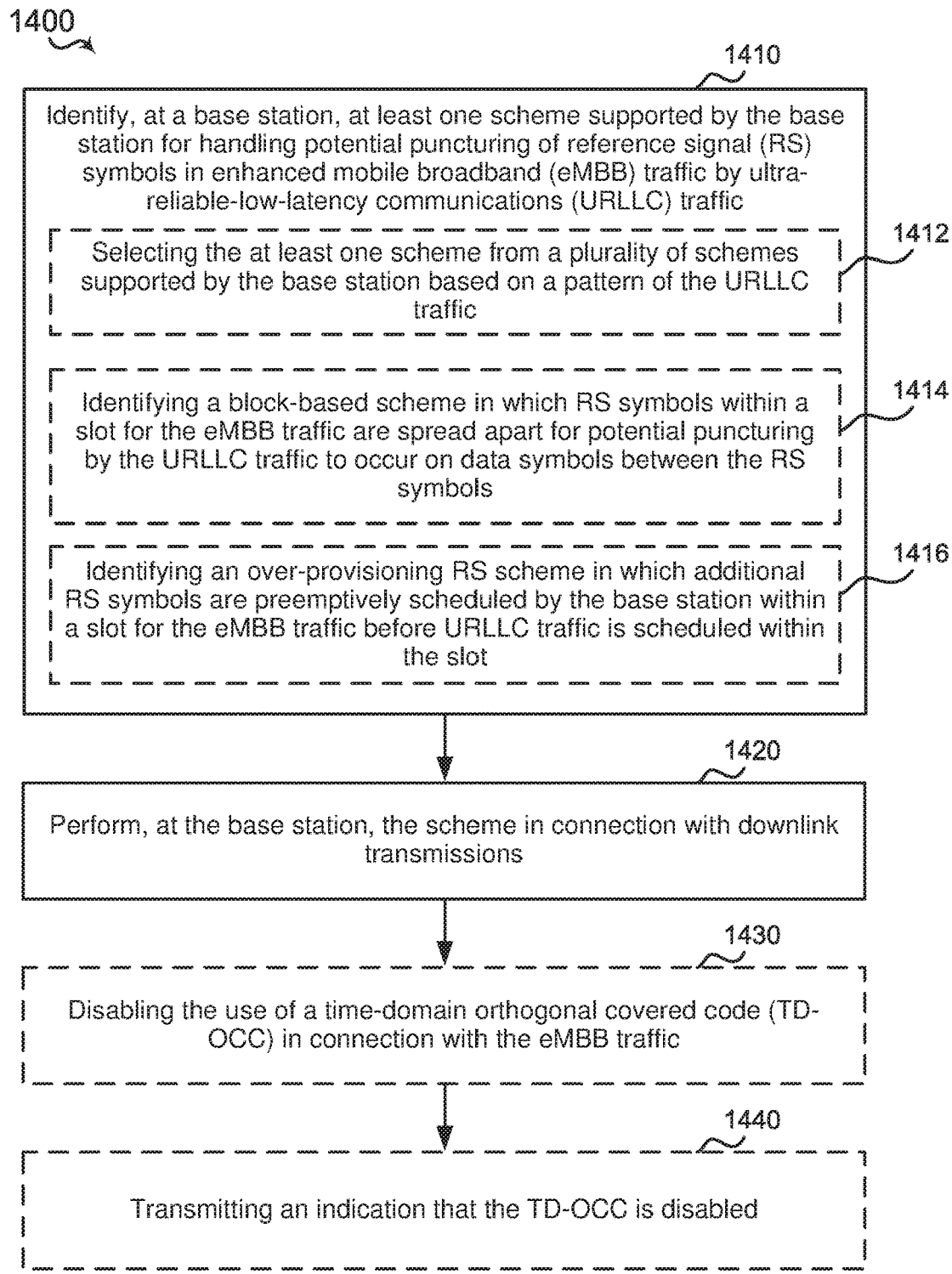
FIG. 14 is a flow diagram of a method for wireless communications used at a base station in connection with recovery of eMBB's RS puncturing from dynamic multiplexing of URLLC and eMBB.

Referring to FIG. 14, for example, a method 1400 of wireless communication in operating base station 105 according to the above-described aspects is illustrated for handling recovery of eMBB's RS puncturing from dynamic multiplexing of URLLC and eMBB.

For example, at 1410, the method 1400 includes identifying, at a base station, at least one scheme for handling puncturing of RS symbols in eMBB traffic by URLLC traffic. In an aspect, the scheme can be preemptive to handle potential puncturing events. That is, each of the at least one scheme may modify an existing RS pattern before puncturing occurs to reduce or minimize the effects of puncturing on the RS symbols within the eMBB traffic. For instance, in an aspect, the base station 105 may execute the processor 1312, the modem 160, and/or one or more subcomponents of the recovery component 170 (e.g., scheme identification 171), as described herein.

At 1420, the method 1400 includes performing, at the base station, the at least one scheme in connection with downlink transmission. For instance, in an aspect, the base station 105 may execute the processor 1312, the modem 160, and/or one or more subcomponents of the recovery component 170, as described herein.

In another aspect of the method 1400, the RS symbols in the eMBB traffic are associated with one or more of a demodulation reference signal (DMRS), a channel state information reference signal (CSIRS), a tracking reference signal, or a general reference signal.

In another aspect of the method 1400, identifying the scheme includes, at 1412, selecting the at least one scheme from a plurality of schemes supported by the base station based on a pattern of the URLLC traffic. For example, the base station 105 includes support in the recovery component 170 for one or more schemes, including support provided by the indication-based dynamic RS pattern scheme 172, the block-based scheme 173, and the over-provisioning RS scheme 174. The scheme identification 171 may select the at least one scheme based on a pattern of the URLLC traffic. For example, if a volume of URLLC traffic satisfies a threshold, the scheme identification 171 may select the block-based scheme 173 or the over-provisioning RS scheme 174.

In another aspect of the method 1400, identifying the scheme can include, at 1414, identifying a block-based scheme in which RS symbols within a slot for the eMBB traffic are spread apart for potential puncturing by the URLLC traffic to occur on data symbols between the RS symbols (see e.g., FIG. 9). For example, the scheme identification 171 may identify the block-based scheme 173. In an aspect, the block-based scheme 173 can be identified or selected as the scheme when the eMBB traffic is a high rank transmission or when operating conditions involve high speed operations. In another aspect, the block-based scheme may include no time-domain consecutive RS symbols in the eMBB traffic.

In another aspect of the method 1400, identifying the scheme can include, at 1416, identifying an over-provisioning RS scheme in which additional RS symbols are preemptively scheduled by the base station within a slot for the eMBB traffic before URLLC traffic is scheduled within the slot (see e.g., FIG. 10). For example, the scheme identification 171 may identify the over-provisioning RS scheme 174.

In another aspect of the method 1400, at 1430, the method can further include disabling or removing the use of a time-domain orthogonal covered code (TD-OCC) in connection with the eMBB traffic, and at 1440 transmitting an indication that the TD-OCC is disabled or removed (see e.g., FIG. 11). For example, the TD-OCC 175 may disable or remove the use of TD-OCC in connection with the eMBB traffic, and transmit an indication 176 that the TD-OCC is disabled or removed.

In yet another aspect of the method 1400, identifying the scheme can include identifying one or more of a scheme specified for a particular cell (e.g., cell-specific scheme), a scheme specified for a particular UE (e.g., a UE-specific scheme), or a scheme specified for a particular RS resource (e.g., an RS-source-specific scheme, where the RS source can be, for example, DMRS, CSIRS, tracking RS, and/or general RS).

Figure 15:
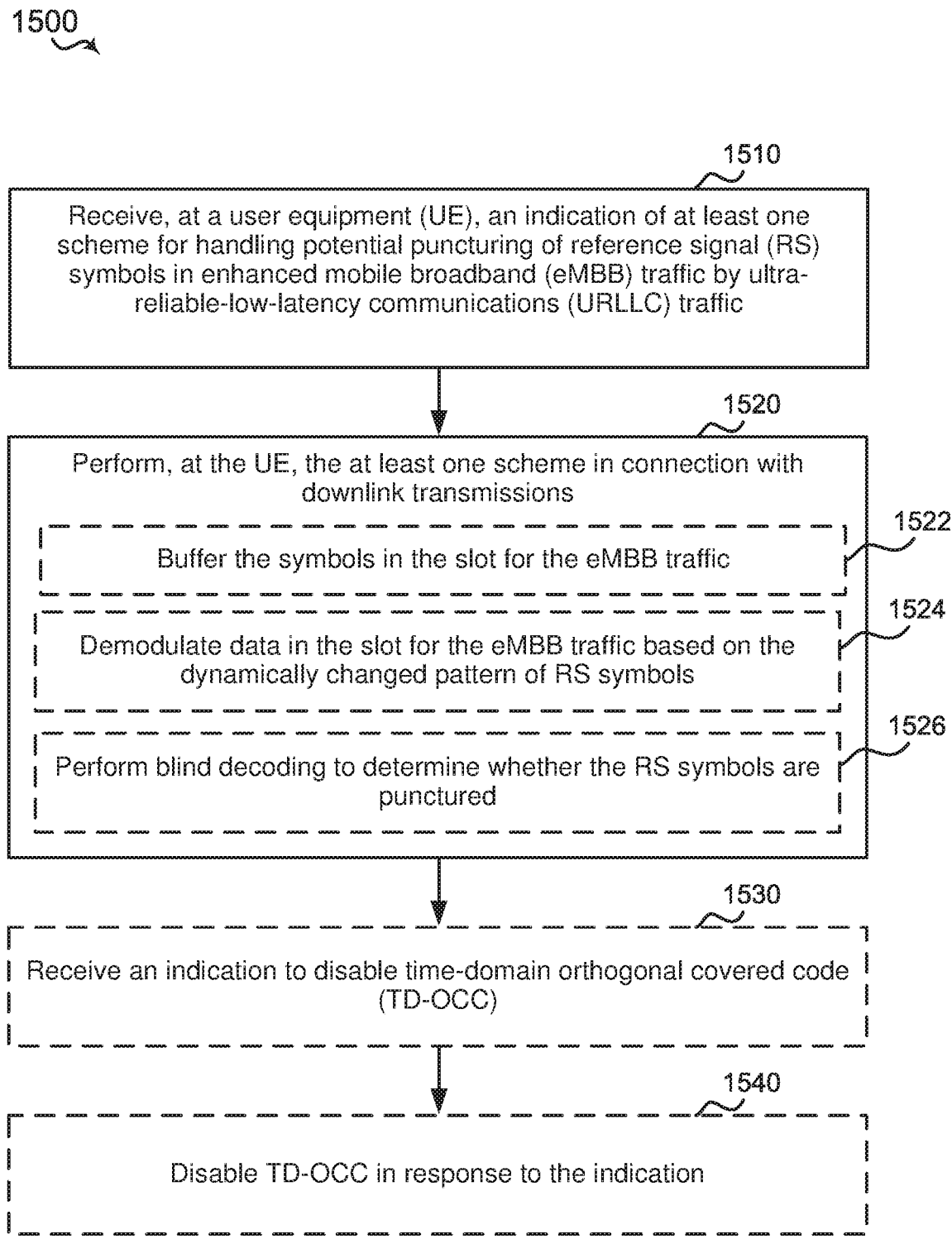
FIG. 15 is a flow diagram of a method for wireless communications used at a UE in connection with recovery of eMBB's RS puncturing from dynamic multiplexing of URLLC and eMBB.

Referring to FIG. 15, for example, a method 1500 of wireless communication in operating UE 110 according to the above-described aspects is illustrated for handling recovery of eMBB's RS puncturing from dynamic multiplexing of URLLC and eMBB.

For example, at 1510, the method 1500 includes receiving, at a UE, an indication of at least one scheme for handling puncturing of RS symbols in eMBB traffic by URLLC traffic. The at least one scheme can be preemptive to handle potential puncturing events. That is, each of the at least one scheme may modify an existing RS pattern before puncturing occurs to reduce or minimize the effects of puncturing on the RS symbols within the eMBB traffic. For instance, in an aspect, the UE 110 may execute the processor 1212, the modem 140, one or more subcomponents of the recovery component 150, the transceiver 1202, and/or the RF front end 1288, as described herein.

At 1520, the method 1500 includes performing, at the UE, the at least one scheme in connection with downlink transmission. For instance, in an aspect, the UE 110 may execute the processor 1212, the modem 140, and/or one or more subcomponents of the recovery component 150, as described herein.

In another aspect of the method 1500, the RS symbols in the eMBB traffic can be associated with one or more of a demodulation reference signal (DMRS), a channel state information reference signal (CSIRS), a tracking reference signal, or a general reference signal.

In another aspect of the method 1500, the indication can identify the scheme from a plurality of schemes supported by the UE. For example, the UE 110 includes support in the recovery component 150 for one or more schemes, including support provided by the indication-based dynamic RS pattern scheme 152, the block-based scheme 153, and the over-provisioning RS scheme 154. In another aspect of the method 1500, the scheme can be an indication-based RS pattern scheme in which a pattern of RS symbols in a slot for the eMBB traffic is changed based at least in part on the URLLC traffic. The pattern of RS symbols can be changed based on a pre-configured pattern (see e.g., FIGS. 7 and 8 where the location or pattern of RS symbols changes in response to potential puncturing by a URLLC mini-slot). In this case, performing the indication-based RS pattern scheme can include, at 1522, buffering the symbols in the slot for the eMBB traffic, and at 1524, demodulating data in the slot for the eMBB traffic based on the dynamically changed pattern of RS symbols.

In another aspect of the method 1500, the scheme can be a block-based scheme in which RS symbols within a slot for the eMBB traffic are spread apart for potential puncturing by the URLLC traffic to occur on data symbols between the RS symbols (see e.g., FIG. 9). For example, the scheme identification 151 may identify or select the block-based scheme 153. The block-based scheme 153 can be associated with the eMBB traffic when the eMBB traffic is a high rank transmission or when operating conditions involve high speed operations.

In another aspect of the method 1500, the scheme can be an over-provisioning RS scheme in which additional RS symbols are preemptively scheduled by the base station within a slot for the eMBB traffic (see e.g., FIG. 10). For example, the scheme identification 151 may identify or select the over-provisioning RS scheme 154.

In another aspect of the method 1500, the method can further include, at 1530, receiving an indication to disable or remove time-domain orthogonal covered code (TD-OCC), and at 1540, disabling or removing TD-OCC in response to the indication (see e.g., FIG. 11). For example, the TD-OCC may receive the indication 156 to disable or remove TD-OCC and disable or remove TD-OCC in response to the indication 156.

In yet another aspect of the method 1500, identifying the scheme can include identifying one or more of a scheme specified for a particular cell (e.g., cell-specific scheme), a scheme specified for a particular UE (e.g., a UE-specific scheme), or a scheme specified for a particular RS resource (e.g., an RS-source-specific scheme, where the RS source can be, for example, DMRS, CSIRS, tracking RS, and/or general RS).

Although the operations or methods described above are presented in a particular order and/or as being performed by an example component, it should be understood that the ordering of the actions and the components performing the actions may be varied, depending on the implementation. In addition, aspects of any one of the methods described above can be combined with aspects of any other of the methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed:

1. A method for wireless communications, comprising:
   identifying, at a base station, at least one scheme supported by the base station for handling puncturing of reference signal (RS) symbols in enhanced mobile broadband (eMBB) traffic by ultra-reliable-low-latency communications (URLLC) traffic, wherein each of the at least one scheme modifies an existing RS pattern configured for the eMBB traffic before puncturing occurs in response to a presence of the URLLC traffic, wherein the at least one scheme includes a block-based scheme in which RS symbols within a slot for the eMBB traffic are spread apart for potential puncturing by the URLLC traffic to occur on data symbols between the RS symbols; and
   performing, at the base station, the at least one scheme in connection with downlink transmissions.

2. The method of claim 1, wherein the RS symbols in the eMBB traffic are associated with one or more of:
   a demodulation reference signal (DMRS),
   a channel state information reference signal (CSIRS),
   a tracking reference signal, or
   a general reference signal.

3. The method of claim 1, wherein identifying the at least one scheme comprises selecting the at least one scheme from a plurality of schemes supported by the base station based on a pattern of the URLLC traffic.

4. The method of claim 3, wherein the at least one scheme is selected in response to a volume of URLLC traffic satisfying a threshold.

5. The method of claim 1, wherein the block-based scheme includes no time-domain consecutive RS symbols in the eMBB traffic.

6. The method of claim 1, further comprising:
   disabling use of a time-domain orthogonal covered code (TD-OCC) in connection with the eMBB traffic; and
   transmitting an indication that the TD-OCC is disabled.

7. The method of claim 1, wherein identifying the at least one scheme comprises identifying one or more of:
   a scheme specified for a particular cell,
   a scheme specified for a particular UE, or
   a scheme specified for a particular RS resource.

8. The method of claim 1, wherein identifying the at least one scheme comprises identifying an over-provisioning RS scheme in which additional RS symbols are preemptively scheduled by the base station within a slot for the eMBB traffic before URLLC traffic is scheduled within the slot.

9. A method for wireless communications, comprising:
   receiving, at a user equipment (UE), an indication of at least one scheme for handling puncturing of reference signal (RS) symbols in enhanced mobile broadband (eMBB) traffic by ultra-reliable-low-latency communications (URLLC) traffic, wherein each of the at least one scheme modifies an existing RS pattern configured for the eMBB traffic before puncturing occurs in response to a presence of the URLLC traffic, wherein the at least one scheme includes a block-based scheme in which RS symbols within a slot for the eMBB traffic are spread apart for potential puncturing by the URLLC traffic to occur on data symbols between the RS symbols; and
   performing, at the UE, the at least one scheme in connection with downlink transmissions.

10. The method of claim 9, wherein the RS symbols in the eMBB traffic are associated with one or more of:
    a demodulation reference signal (DMRS),
    a channel state information reference signal (CSIRS),
    a tracking reference signal, or
    a general reference signal.

11. The method of claim 9, wherein the indication identifies the at least one scheme from a plurality of schemes supported by the UE.

12. The method of claim 9, wherein a pattern of RS symbols in a slot for the eMBB traffic is changed based at least in part on a pattern of URLLC traffic.

13. The method of claim 12, wherein the pattern of RS symbols is changed based on a pre-configured pattern.

14. The method of claim 12, wherein performing the at least one scheme comprises:
buffering the symbols in the slot for the eMBB traffic; and
demodulating data in the slot for the eMBB traffic based on the changed pattern of RS symbols.

15. The method of claim 9, further comprising:
receiving an indication to disable time-domain orthogonal covered code (TD-OCC); and
disabling TD-OCC in response to the indication.

16. The method of claim 9, wherein identifying the at least one scheme comprises identifying one or more of:
a scheme specified for a particular cell associated with the UE,
a scheme specified for the UE, or
a scheme specified for a particular RS resource.

17. The method of claim 9, wherein the at least one scheme includes an over-provisioning RS scheme in which additional RS symbols are preemptively scheduled by a base station within a slot for the eMBB traffic before URLLC traffic is scheduled within the slot.

18. An apparatus for wireless communications, comprising:
a memory having stored instructions; and
a processor in communication with the memory;
wherein the processor is configured to execute the instructions to:
identify, at a base station, at least one scheme supported by the base station for handling puncturing of reference signal (RS) symbols in enhanced mobile broadband (eMBB) traffic by ultra-reliable-low-latency communications (URLLC) traffic, wherein each of the at least one scheme modifies an existing RS pattern configured for the eMBB traffic before puncturing occurs in response to a presence of the URLLC traffic, wherein the at least one scheme includes a block-based scheme in which RS symbols within a slot for the eMBB traffic are spread apart for potential puncturing by the URLLC traffic to occur on data symbols between the RS symbols; and
perform, at the base station, the at least one scheme in connection with downlink transmissions.

19. The apparatus of claim 18, wherein the processor is configured to select the at least one scheme from a plurality of schemes supported by the base station based on a pattern of the URLLC traffic.

20. The apparatus of claim 18, wherein the block-based scheme includes no time-domain consecutive RS symbols in the eMBB traffic.

21. The apparatus of claim 18, wherein the processor is configured to execute the instructions to:
disable use of a time-domain orthogonal covered code (TD-OCC) in connection with the eMBB traffic; and
transmit an indication that the TD-OCC is disabled.

22. The apparatus of claim 18, wherein identifying the at least one scheme comprises identifying an over-provisioning RS scheme in which additional RS symbols are preemptively scheduled by the base station within a slot for the eMBB traffic before URLLC traffic is scheduled within the slot.

23. An apparatus for wireless communications, comprising:
a memory having stored instructions; and
a processor in communication with the memory;
wherein the processor is configured to execute the instructions to:
receive, at a user equipment (UE), an indication of at least one scheme for handling puncturing of reference signal (RS) symbols in enhanced mobile broadband (eMBB) traffic by ultra-reliable-low-latency communications (URLLC) traffic, wherein each of the at least one scheme modifies an existing RS pattern configured for the eMBB traffic before puncturing occurs in response to a presence of the URLLC traffic, wherein the at least one scheme includes a block-based scheme in which RS symbols within a slot for the eMBB traffic are spread apart for potential puncturing by the URLLC traffic to occur on data symbols between the RS symbols; and
perform, at the UE, the at least one scheme in connection with downlink transmissions.

24. The apparatus of claim 23, wherein the indication identifies the at least one scheme from a plurality of schemes supported by the UE.

25. The apparatus of claim 23, wherein the processor is configured to execute the instructions to:
receive an indication to disable time-domain orthogonal covered code (TD-OCC); and
disable TD-OCC in response to the indication.

26. The apparatus of claim 23, wherein the at least one scheme includes an over-provisioning RS scheme in which additional RS symbols are preemptively scheduled by the base station within a slot for the eMBB traffic before URLLC traffic is scheduled within the slot.

* * * * *